United States Patent [19]

Hafner et al.

[11] 4,119,804
[45] Oct. 10, 1978

[54] OPEN LOOP SYSTEM FOR TRANSMITTING DIGITAL INFORMATION

[75] Inventors: Emanuel Hafner, Hintenkappelen; Bertil Forss, Grosshochstetten, both of Switzerland

[73] Assignee: Hasler AG, Bern, Switzerland

[21] Appl. No.: 780,851

[22] Filed: Mar. 24, 1977

[30] Foreign Application Priority Data

Mar. 30, 1976 [CH] Switzerland ............................ 3929/76

[51] Int. Cl.² ............................................. H04J 6/00
[52] U.S. Cl. ............................ 179/15 AL; 179/15 BA
[58] Field of Search ............ 179/15 AL, 15 BA, 15 A

[56] References Cited

U.S. PATENT DOCUMENTS

| | | | |
|---|---|---|---|
| 3,883,693 | 5/1975 | Moore | 179/15 AL |
| 3,891,804 | 6/1975 | Hachenburg | 179/15 AL |
| 3,906,153 | 9/1975 | Polischuk-Sawtschenko | 179/15 AL |
| 3,979,733 | 9/1976 | Fraser | 179/15 AQ |
| 4,009,469 | 2/1977 | Boudreau et al. | 179/15 AL |

Primary Examiner—Douglas W. Olms
Attorney, Agent, or Firm—Brady, O'Boyle & Gates

[57] ABSTRACT

A plurality of subscriber stations is connected to one or more PCM multiplex lines of a PCM switching network via a unidirectional loop and a transfer station. The subscriber stations are series connected to the loop on which addressed telegrams circulate originating and ending at the transfer station. The subscriber stations receive the telegrams addressed to them and exchange them for transmission to the transfer station. The transfer station transmits a time-slot received on the PCM line as an addressed telegram and vice-versa. For enhancing reliability all subscribers can be connected via a second loop and a second transfer station to one or more further PCM lines.

6 Claims, 5 Drawing Figures

OPEN LOOP SYSTEM FOR TRANSMITTING DIGITAL INFORMATION

This invention relates to equipment for the transfer of digital information between several lines which form part of an exchange network, and a plurality of subscriber stations which are connected via subscriber connection circuits in series to a loop on which bit groups circulate in exclusively one direction, and wherein the subscriber connection circuits check all bit groups filtering out those bit groups intended for them, replacing each filtered-out bit group by another bit group and sending out these replaced bit groups in place of the ones filtered out.

BACKGROUND OF THE INVENTION

Known from Swiss Pat. Nos. 497,103, 550,521 and 554,114 are digitally-working loop systems in which the transfer of information between the connected subscriber stations is effected by code-addressed telegrams. Such systems are used generally for the exchange of information in fairly closely limited, local regions.

Furthermore known nowadays is the PCM technique for the multiple use of lines. It is used particularly for the connection of telephone exchanges with one another. With the IFS project of the Swiss PTT an attempt is being made to use the PCM-technique in the wider framework of the communications technique. For example Swiss Pat. No. 550,519 gives information on this. The PCM technique ends here too in telephone exchanges.

Known through "Bell Laboratories Record", volume 50, No. 3, March 1972, pages 80–86, there is finally a conventionally-working exchange network to which a PCM loop system is connected. The transition from the analogue technique to the digital technique is effected by Delta modulation and by the coordination of time slots to the analogue lines which are selected via a conventional exchange apparatus as well as to the subscriber stations. In this way the exchange of information between these stations and the network is possible.

The task of the present invention now consists in operating, in PCM networks, the digital technique to the subscriber stations.

SUMMARY OF THE INVENTION

The invention provides equipment for the transfer of digital information between several lines which form part of an exchange network, and a plurality of subscriber connection circuits in series to a loop on which bit groups circulate in exclusively one direction, and wherein the subscriber connection circuits check all bit groups filtering out those bit groups intended for them, replacing each filtered-out bit group by another bit group and sending out these replaced bit groups in place of the ones filtered out, wherein the lines belonging to the exchange network are PCM multiplex lines; the start and the end of each loop and at least one PCM multiplex line of the exchange network are connected to respectively one network connection circuit; the bit groups circulating on the loops are telegrams comprising an address part, a signalling part and an information part; the network connection circuits are adapted to convert the content of each PCM time slot arriving successively on a PCM line into the information part of a telegram; they further insert the relevant time slot numbers as the address part of the telegrams and send these out onto the relevant loop; and they conversely convert the information part of the telegrams arriving from the loop into the content of the PCM time slots associated with the telegram addresses.

BRIEF DESCRIPTION OF THE DRAWINGS

The invention will be described further, by way of example, with reference to the accompanying drawings, in which.

DESCRIPTION OF THE PREFERRED EMBODIMENT

Figure 1:
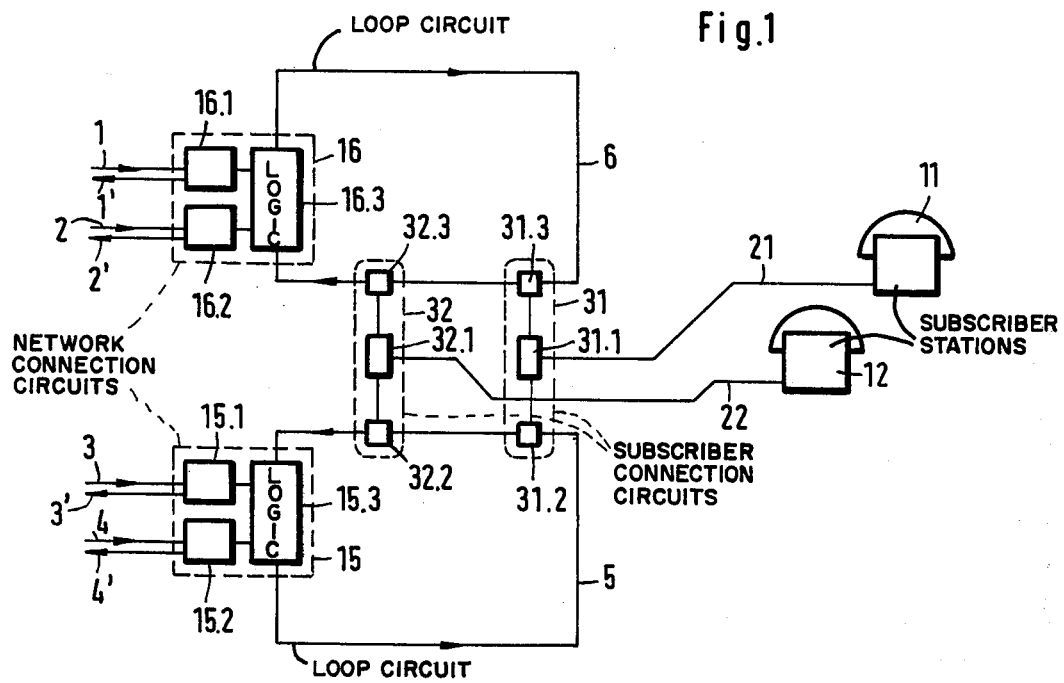
FIG. 1 is a block diagram of the preferred equipment for the transmission of digital information.

FIG. 1 shows the fundamental construction of equipment for the transmission of digital information between several PCM multiplex lines and a plurality of subscriber stations. The four PCM multiplex lines belong to a centrally controlled PCM network which is not shown. Each PCM multiplex line consists of two cables. The cables running towards the equipment for the transmission of digital information are designated by 1, 2, 3 and 4, and the cables for the reverse direction are designated by 1', 2', 3' and 4'.

Of the plurality of subscriber stations, only two subscriber stations 11 and 12 represented as telephones are shown. The subscriber stations, which can work either in analogue number or digitally, are connected via a respective line 21 or 22 to the digitally-working subscriber connection circuits 31 and 32 respectively.

Each subscriber connection circuit breaks up into three sub-units, into the subscriber circuits 31.1 or 32.1, as well as into the two identical loop connection 31.2 and 31.3 or 32.2 and 32.3. The loop connections are serially connected to two or equal loops 5 and 6, working independently of one another, in such a way that each subscriber connection circuit is connected by one loop connection to each of the two loop lines.

Each loop (5,6) is connected, by its beginning and its end, to a network connection circuit 15 (or 16). Each network connection circuit consists of two identical network connections 15.1 and 15.2 (or 16.1 and 16.2) as well as a logic circuit 15.3 (or 16.3) which despatch code addressed telegrams in exclusively one direction onto the loop 5 (or 6) which is associated with them and conversely receive same from the loop ends.

The network connection circuits 15 and 16 are further connected the the PCM multiple line 3, 3' and 4, 4' (or 1, 1' and 2, 2'). Serving as receiving and transmitting units are, in this respect, the identical network connections 15.1 and 15.2 (16.1 and 16.2). Each network connection circuit thus connects two PCM lines with one loop.

A message connection between a subscriber station and the PCM network can now arise either via the loop 5 (or 6), the relevant logic circuit 15.3 (or 16.3), one of respectively two relevant network connection units 15.1 or 15.2, (or 16.1 or 16.2), and one of the four PCM multiple lines 1, 1'; 2, 2'; 3, 3' or 4, 4'. In this respect, in the relevant subscriber connection circuit it is ensured that the unused loop connection is switched off or blocked.

The transmission on each of the four PCM multiple lines 1, 1'; 2, 2'; 3, 3' and 4, 4' is effected in known manner in accordance with CEPT standards in consecutive frames of 32 time slots, of which the time slot 0 serves for the synchronization and the time slot 16 serves for the signalling. The remaining 30 time slots are available for the transmission of information for a corresponding number of message connections, such as telephone connections.

The transmission on each of the two loops 5 and 6 is effected by means of code-addressed telegrams which are despatched by the logic circuits 15.3 or 16.3 respectively in uninterrupted sequence. The telegrams run successively through all of the loop connections 31.2, 32.2 and so forth or 31.3, 32.3 and so forth, and finally arrive back once more at the logic circuit 15 or 16.

Figure 2:
FIG. 2 is a schematic representation of a telegram.

FIG. 2 shows the format of a telegram. Each telegram consists of 24 bits, of which the bits 0–10 are designated as the address, the bits 11–13 are designated as signalling "sign" and the bits 14–23 are designated as information. If no information lies ready for despatch in the logic circuits, empty telegrams are despatched. Apart from the rigid telegram sequence there is, on the loop lines 5 and 6, no other structure, in other words, no frames of any kind.

On each loop each telegram runs through all of the loop connections. Each loop connection possesses an address register, with the aid of which it recognizes when a telegram is intended for it. If the telegram is not intended for it, then the telegram is retransmitted unaltered. On the other hand, if the telegram is intended for it, then it is retransmitted in modified form.

Save for the empty telegrams, in this way in the general instance, each telegram is modified upon the circulation via the loop line by one of the numerous loop connections. The logic circuits 15.3 (or 16.3) recognize thereby the orderly working. Non-modified returning telegrams indicate a fault or during the establishment of the connection, indicate that the subscriber station called is already engaged.

The modification of the telegram in a loop connection, for example 31.2, consists in an exchange of the telegram information and signalling. The incoming information is removed from the telegram and supplied to the subscriber circuit 31.1. Subsequently, the signalling is replaced by the new signalling and the incoming information is replaced by the outgoing information lying ready. This procedure is effected so rapidly that the telegram maintains its place in the rigid telegram flow.

The network connection circuits 15 and 16 serve, as previously stated, as junction between the PCM network and the loops. In this respect, the network connections 15.1, 15.2, 16.1 and 16.2 each for one PCM multiplex line, receive and dispatch PCM time slots as is known from the PCM technique.

The logic circuits 15.3 or 16.3 form telegrams in the rhythm of the incoming time slots, in that they take the addresses associated with the time slots, from a counter, and assemble the same with the signalling bits and the content of the time slots as information into telegrams. These telegrams are dispatched immediately, so that no congestion can arise.

In the reverse direction, the logic circuits 15.3 or 16.3 receive the returning telegrams. From the telegram address they gather with what time slot of which PCM multiplex line the telegram is associated. They accordingly store the information in the correct storage location of the correct one of the two necessary stores having 32 storage cells each, from which the content is read out periodically and is dispatched as content of PCM time slots via the corresponding PCM multiple lines.

For more extensive comprehension, the subassemblies are described in more detailed manner hereinunder.

Figure 3:
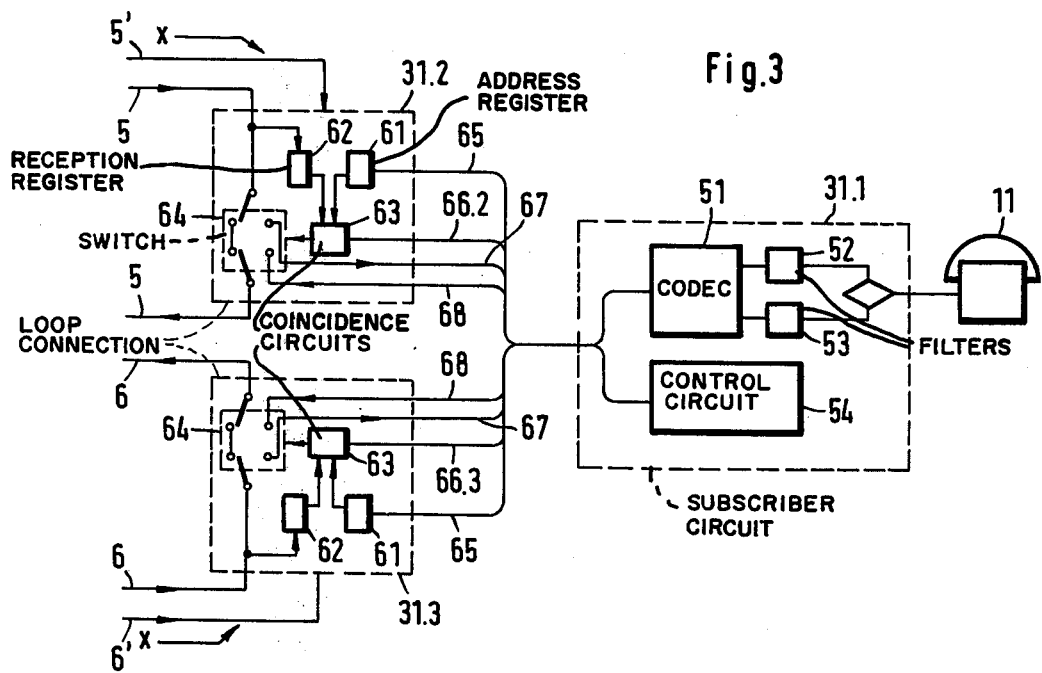
FIG. 3 is a detailed block diagram of a sbuscriber connection circuit.

FIG. 3 shows the subscriber connection circuit 31 with the sub-units of subscriber circuit 31.1 and the two loop connections 31.2 and 31.3, which are connected to the loops 5 or 6. The subscriber station 11 is, as in FIG. 1, a conventional telephone.

The subscriber circuit 31.1 contains the equipment for the transition from the digital technique to the conventional analogue technique, which in the embodiment shown, consists of a codec 51 and two filters 52 and 53. On the other hand, it contains a control circuit 54, from which the two identical loop connections 31.2 and 31.3 are checked, coordinated and controlled, and in which several addresses are stored in quasi-stationary manner or for a short time, as described later on in more detail.

Each loop connection has an address register 61, the length of which amounts to 11 bits, and the content forms an address which is written in by the control circuit 54 in accordance with the changing requirements. Furthermore, it has an equally long reception register 62, into which all of the telegrams run. A coincidence circuit 63 and a double switch 64 complete the loop connection.

Extending parallel with the actual loop lines 5 and 6 are the timing lines 5' and 6' which time and synchronize the bit flow on the loop with the timing $x$.

The telegrams run, after arrival in the loop connection (for example 31.2), bit by bit via the switch 64 to the output. At the same time, they run into the reception register 62. Since the telegrams begin in accordance with FIG. 2 with the address, after 11 timing steps the complete telegram address is present in the reception register 62. Initiated by a control command, the coincidence circuit 63 now compares the contents of register 61 and 62.

If the content (the telegram address and the stored address) do not correspond, then the switch 64 remains in its position and the telegram leaves the loop connection in unamended form.

However, if the coincidence circuit 63 ascertains the conformity of the addresses, then it switches the switch 64 over without delay. In this way, the rest of the incoming telegrams (consisting of the signalling and the information) passes via the line 67 to the codec 51 and to the control circuit 54, while at the same time, via the line 68, the new signalling and the new information (which lies ready-prepared in the control circuit) is appended in jointless manner to the telegram address and leaves the loop connection with this as a modified telegram.

The lines 66.2 and 66.3 serve for controlling the coincidence circuits 63 in such a way that the control circuit 54, with its help during a connection via, for example, the loop connection 31.3, blocks the loop connections 31.2, or conversely, the ascertaining of address coincidences being made impossible. In this way the telegrams received in the normal case, run in unmodified form back to the logic circuit 15.3 or 16.3, respectively, which there, as previously mentioned, is evaluated as criterion for the engaged instance.

Figure 4:
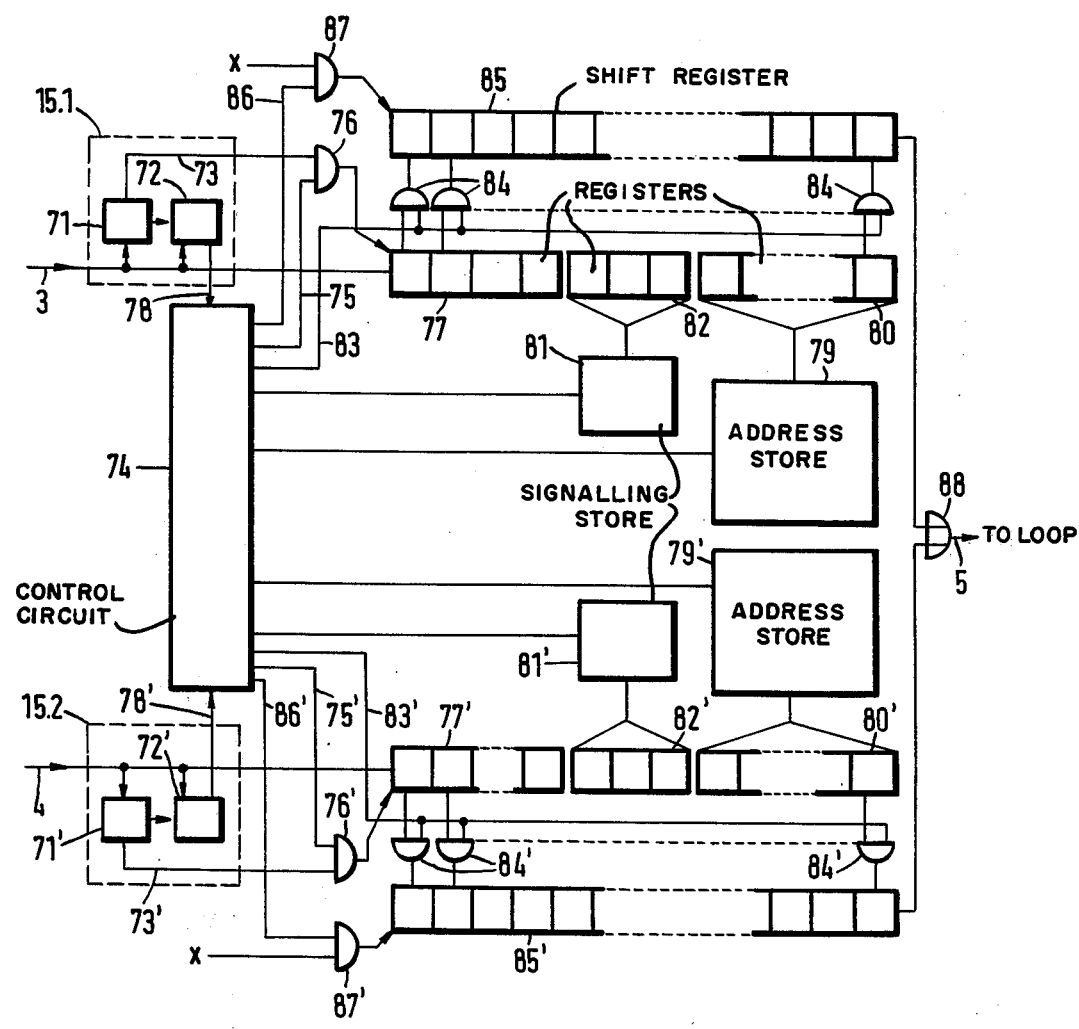
FIG. 4 is a detailed block diagram of individual parts of the network connection circuit which are necessary for the transfer from the PCM network onto the loop.

FIG. 4 shows in detailed form, the structural units of the network connections 15.1 and 15.2, as well as those structural units of the logic circuit 15.3, which are necessary for the transfer from the PCM network to the loop 5.

The incoming cables of the PCM multiplex lines are designated in accordance with FIG. 1 by 3 and 4. In uninterrupted manner, bits arrive independently on both lines and, circumstances permitting, with different timing frequencies. The synchronizing units 71 and 71' regenerate the bit timing, while the frame synchronization units 72 and 72' combine respectively eight related bits into a PCM time slot, as known from the PCM technique.

The PCM bit rhythms appear on the lines 73 or 73', respectively. If the gate 76 or the gate 76' are enabled by the control circuit 74 via the line 75 or 75', then with the corresponding PCM bit rhythm, one PCM time slot after the other is inserted into the shift registers 77 or 77', respectively.

The control circuit 74 registers via the lines 78 and 78' which of the 32 possible PCM time slots is arriving. In accordance with the determined time slot number, the control circuit 74 selects the associated address in the address store 79 (or 79') and causes the transfer into the register 80 (or 80'). At the same time, the correct signalling is caused to be transferred from the signalling store 81 (or 81') into the register 82 (or 82').

As soon as a complete PCM time slot is contained in the shift register 77 (or 77'), the control circuit 74 enables, via line 83 (or 83'), all of the gates 84 (or 84'), and the content of the registers 77, 82 and 80 or 77', 82' and 80', is transferred parallel into the shift register 85 (or 85'). The contents of these shift registers 85 and 85', now form complete telegrams which can be sent out onto the loop 5.

The dispatch of the telegrams is effected via a control command on line 86 (or 86') which opens the gate 87 (or 87'). In this way the loop line rhythm $x$ passes to the shift register 85 (or 85') and shifts the content as telegram via the OR-gate 88 onto the loop 5.

The loop rhythm $x$ can either spring from a free oscillator or be derived from the PCM bit timing. The sole pre-requisite which it must fulfill is that it is so rapid that all of the PCM time slots can be processed and sent forward without delay. If no PCM time slot is present, then empty telegrams are formed which are dispatched onto the loop 5 in order to maintain an uninterrupted telegram flow on the loop.

Figure 5:
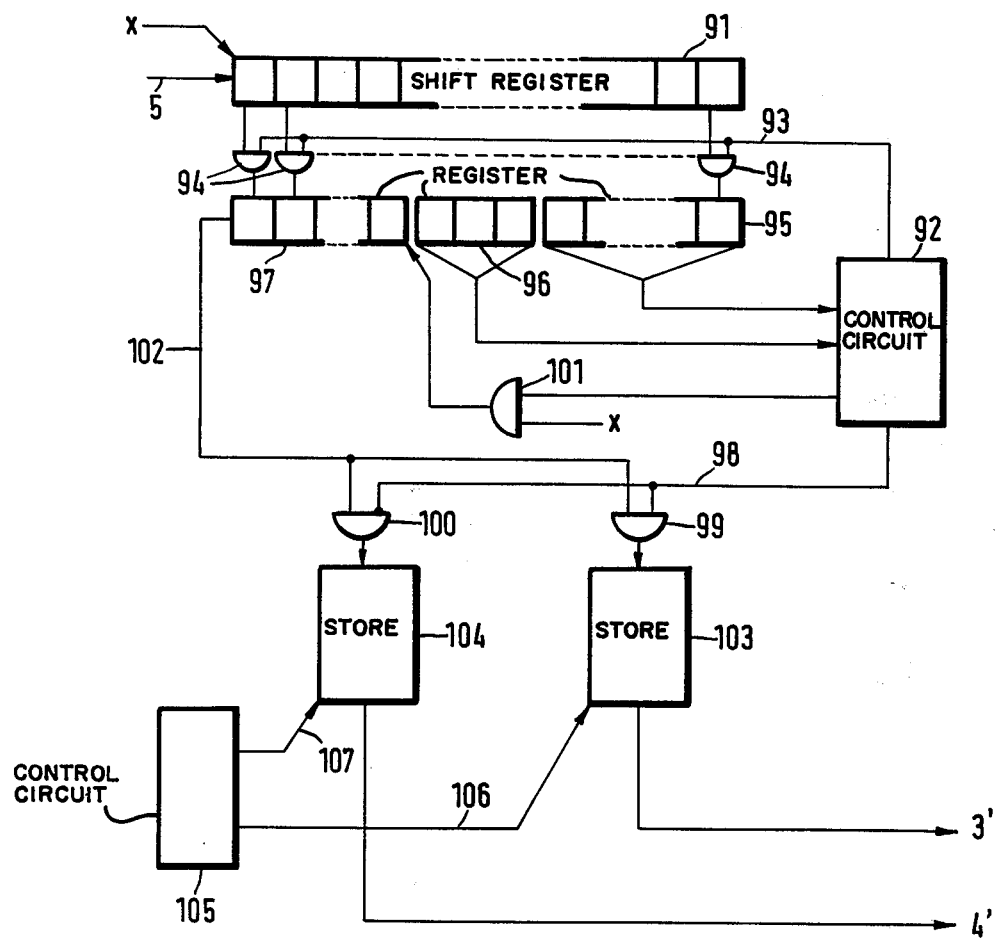
FIG. 5 is a detailed block diagram of those individual parts of the network connection circuit which are necessary for the transfer from the loop to the PCM network.

FIG. 5 shows in detailed form the structural units of the network connections 15.1 and 15.2 as well as those structural units of the logic circuit 15.3 which are necessary for the transition from the loop line 5 onto the outgoing cable 3' and 4' of the PCM multiple lines.

Via the loop 5, all of the telegrams reach the shift register 91, into which they are read with the loop timing $x$. As soon as a complete telegram is contained in the shift register, the control circuit 92 enables, via line 93, all of the gates 94, whereby parts of the telegram are transferred in parallel, into the registers 95, 96 and 97, respectively. In the register 95, there then appears the address of the telegram, in the register 96, the signalling, and in the register 97, the information.

The address and the signalling of the telegram are taken over and checked by the control circuit 92. If a telegram has been modified by any subscriber connection circuit on the path via the loop 5, then the control circuit 92 gathers from the signalling and the address, which outgoing PCM multiplex line and which time slot of this line the telegram is associated with.

In accordance with this data, the control circuit 92, enables, via line 98, either the AND-gate 99 or the AND-NOT-gate 100. At the same time, it enables the gate 101, whereby the content of the register 97, i.e., the telegram information, is read via the line 102 either into the store 103 or 104. Each of these two stores has 32 storage locations of 8 bits each, which correspond to the 32 time slots of the PCM multiple lines 3' and 4'. The telegram information is now controlled by the control circuit 92, so read in, that the storage location, corresponding to the telegram address, is occupied.

Within a time interval which corresponds to 32 PCM time slots of the corresponding PCM multiplex line, a maximum of 32 telegrams reach the respective store and fill all of the storage locations thereof. This case corresponds to the maximum transmission capacity of the PCM line in which each PCM time slot is utilized for one message connection. However, if fewer time slots are utilized, then within the said space of time, a corresponding number of storage spaces remain empty, since no telegrams with the corresponding addresses are circulating on the loop 5.

In the rhythm of the PCM time slots, the storage locations of the stores 103 and 104 are read-out cyclically and periodically onto the PCM multiple lines 3' (or 4'). This procedure is controlled by the control circuit 105, which supplies, via the line 106 (or 107), corresponding control and timing signals.

The described equipment for the transmission of the digital information from PCM multiple lines to the subscriber stations connected to a loop, works with several types of addresses or identifications.

PCM time slots arrive permanently on the PCM multiplex lines 1,2, 3 and 4. Each 32 such consecutive time slots are combined into a frame and the time slots of a frame are numbered from 0 to 31. The control circuit 74 registers, via the frame synchronization 72, constantly, these time slot numbers.

The address of a normal telegram, which is, for example, taken from the address store 79 (FIG. 4), is now equal to this time slot number, consisting of a 5-digit binary number, and the additional indication as to which PCM multiple line the time slot has arrived.

In the subscriber connection circuit, for example 31, FIG. 3, in the control circuit 54, and in the address register 61, for the duration of a connection precisely this address, in other words, the time slot number and the PCM line number, is stored. In this way, for the duration of the connection, the contents of all of the PCM time slots of this number are sent to this subscriber station (in the example chosen subscriber station 11) and received by the relevant subscriber connection circuit 31.

If no connection exists between a subscriber station (e.g. 11) and the PCM network, then in this state of rest, in the address register 61, and address comprising 10 bits, is stored, which is firmly associated with the control circuit 54.

In the same way, associated with each control circuit of each other subscriber connection circuit connected to the loop, is also an address which comprises ten bits.

Applicable to all these addresses, is the fact that they are unequivocal and distinguishable. Because of this requirement, the number of subscriber stations which can be connected to one loop is limited to 1024.

If the subscriber station 11 is called by a subscriber of the PCM network, then the call information passes with the aid of several signalling time slots, time slot 16 of each PCM frame for example, via the line 3 to the control circuit 74 (FIG. 4). This then causes the sending-off of a switching telegram onto the loop 5, in which the 10-bit address is used as the address and the number of the PCM time slot to be used for the transmission of information. This telegram is recognized and received by the subscriber connection circuit 31.

The switching telegram received is modified if the subscriber station 11 is not engaged. The modified switching telegram leaves, as described further ahead, the subscriber connection circuit 31, and if finally received and processed in the logic circuit 15.3.

The signalling and information of the switching telegram, received by the subscriber connection circuit 31, passes to the control circuit 54, is stored here and is subsequently written into the address register 61 as address for the established connection.

If the subscriber 11, starting from the state of rest, himself wishes to establish a connection, then the control circuit 54 shifts the empty address into the two address registers 61. In this way, one of the two loop connections 31.2 or 31.3 can fish an empty telegram out of the telegram flows on line 5 or 6 respectively.

The empty telegram fished out, is then modified by inserting the 10-bit address and sent on to the logic circuit 15.3 or 16.3 respectively, where the allocation of a PCM time slot is effected.

The advantages of the invention are to be seen in the following points:

The equipment for the transmission of digital information is a completely digital system in which only the actual subscriber station, which is, for example, designed as a conventional telephone, works in analogue manner.

The equipment works in a blocking-free manner and needs only trivial stores.

Each subscriber station can be reached on different paths. This increases the flexibility and the reliability.

The equipment forms a decentralized structure which has only as many subscriber connection circuits as there are subscriber stations connected.

In supplementation to the above description of a preferred embodiment of the invention, additionally, a few variations are shown hereinunder:

The equipment can also cooperate with less than four PCM multiplex lines, in other words, with one, two or three lines.

Likewise, it is possible to connect the subscriber connection lines to more, e.g. three, or less, in other words, only one loop.

Each loop begins and ends in a logic circuit (15.3 or 16.3). The message flow is effected the described equipment exclusively from the PCM network to the loop and back again. Through relatively slight supplimentations, it is, however, possible to convey telegrams between two subscriber stations, connected to the same loop, from the end of the loop directly to its beginning whereby the open loop line is converted into a closed loop.

In FIG. 4, the two shift registers 85 and 85' can be combined into a First-in-First-out register which has an combined into a First-in-First-out register which has an additional small buffer capacity which makes it possible to compensate for the timing frequency differences in a simpler manner.

A semiconductor switch is used as the double switch 64 of the subscriber connection circuit.

The subscriber circuits (e.g. 31.1) are designed individually for the various types of subscriber stations, which can, for example, be teleprinters, facsimile equipment, computers, conventional or digital telephones and so forth.

The terms and expressions which have been employed herein are used as terms of description and not limitation, and there is no intention, in the use of such terms and expressions, of excluding any equivalents of the features shown and described or portions thereof but it is recognized that various modifications are possible within the scope of the invention claimed.

What is claimed is:

1. Equipment for the transfer of digital information between several lines which form part of an exchange network, and a plurality of subscriber stations which are connected via subscriber connection circuits in series to a loop on which bit groups circulate in exclusively one direction, and wherein the subscriber connection circuits check all bit groups filtering out those bit groups intended for them, replacing each filtered-out bit group by another bit group and sending out these replaced bit groups in place of the ones filtered out, wherein: the lines belonging to the exchange network are PCM multiplex lines (1,1' till 4, 4'); the start and the end of each loop (5, 6) and at least one PCM multiplex line (1,1' till 4, 4') of the exchange network are connected to respectively one network connection circuit (15, 16); the bit groups circulating on the loops (5, 6) are telegrams comprising an address part, a signalling part and an information part; the network connection circuits (15, 16) are adapted to convert the content of each PCM time slot arriving successively on a PCM line into the information part of a telegram; they further insert the relevant time slot numbers as the address part of the telegrams and send these out onto the relevant loop (5, 6); and they conversely convert the information part of the telegrams arriving from the loop (5, 6) into the content of the PCM time slots associated with the telegram addresses.

2. Equipment as claimed in claim 1, wherein: two loops (5,6) being independent of one another, are provided being connected to two separate network connection circuits (15, 16); all of the PCM multiplex lines (1, 1' till 4, 4') connected to these network connection circuits (15, 16) are independent of one another; each subscriber station (11, 12) is connected via a respective subscriber connection circuit (31, 32) to both loops (5, 6); the information transfer from and to the subscriber stations (11, 12) is possible via each of the two loops (5, 6); and during a call, the connection to the non-used loop (5, 6) is blocked.

3. Equipment as claimed in claim 1, wherein each subscriber connection circuit (31, 32) has two coincidence circuits (63) which are associated with the two loops (5, 6); each subscriber connection circuit (31, 32) further has a control circuit (54); and during a call, the control circuit (54) blocks the non-used coincidence circuit (63).

4. Equipment as claimed in claim 1, wherein each network connection circuit (15, 16) is connected to two PCM multiplex lines (1, 1' till 4, 4') not necessarily running in a timing-synchronous manner, and further is connected to the two ends of one single loop (5, 6).

5. Equipment as claimed in claim 1, the network connection circuit having: at least one first shift register (77) into which the bits of the PCM time slots run serially with the timing of the PCM line; at least one second longer shift register (85) into which the content of the first shift register (77) as well as the content of at least one third register (80, 82) is transferred in parallel when a PCM time slot of 8 bits is contained completely in the first shift register (77); and a control circuit (74) which controls the reading-out of the content of the second shift register (85), onto the loop (5), with a timing faster than the said PCM timing.

6. Equipment as claimed in claim 5, the network connection circuit having: a fourth shift register (91) into which run all bits of the telegrams, coming from the loop (5), a second control circuit (92) which processes the address and signalling parts of the telegram; at least one store with 32 storage locations each of 8 bits, into which storage locations the information part of one telegram is writable; and a third control circuit (105) which periodically and cyclically reads out the content of all the 32 storage locations serially as time slot content onto the outgoing PCM line.

* * * * *